INVENTOR.
HOWARD L. DEMOREST
BY Harold D. Jastrow
ATTORNEY

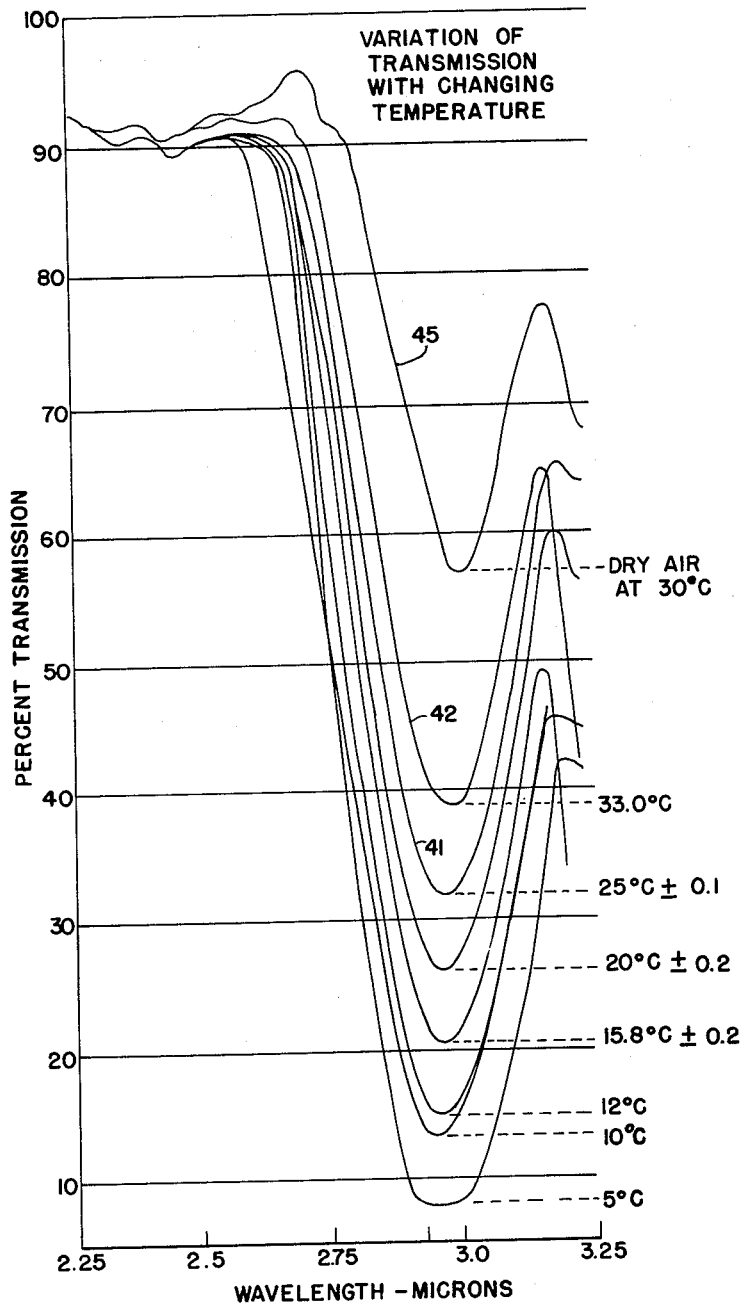

3,153,724
APPARATUS FOR DETECTING HEAT IMAGES BY USING RADIATION ATTENUATING CHARACTERISTICS OF A SORBED MATERIAL
Howard L. Demorest, Minneapolis, Minn., assignor, by mesne assignments, to Litton Systems Inc., Beverly Hills, Calif., a corporation of Maryland
Filed May 28, 1962, Ser. No. 198,170
9 Claims. (Cl. 250—83.3)

This invention relates to a thermal image detector and more particularly to a method and apparatus for detecting heat images by using radiation attenuating characteristics of a sorbed gas.

It is an object of the present invention to provide a new and improved method and apparatus for detecting thermal images.

It is another object of the present invention to provide a new and improved method and apparatus for retrieving information from heat images using a radiation absorption band of a sorbed gas.

It is another object of the invention to provide a new and improved thermal image detector which is simple in operation and which gives a continuous image for visual or electronic observation.

A further object of the present invention is to provide a heat image detector which provides continuous and rapid response to changes in a heat image.

A still further object of the present invention is to provide a heat image detector and method which utilizes the electromagnetic radiation absorption characteristic of materials to provide a heat image which is interrogated to afford visual or electronic observation of the thermal image.

Another object of the present invention is to provide a heat image detector which utilizes the electromagnetic radiation absorption characteristic of a film or layer of material collected from a flow of the material in the gaseous state and sorbed on a substrate to produce a heat image capable of interrogation.

One form of an apparatus and method according to the invention utilizes a thin layer of material which is collected or sorbed by a suitable substrate for producing a heat image which can be interrogated by a beam of electromagnetic radiation. Sorbed will be used to include the situations where a gas such as water vapor is either absorbed or adsorbed by a substrate material. A layer of the material such as water is collected from a carrier gas conducted past the cell to form a thin film of the gaseous material which is heated by a thermal image. The selective heating of the thin film or layer of water by the image produces a variation in the thickness of the layer on the substrate. The material such as water which is selected to form the layer or film demonstrates the characteristic of attenuating electromagnetic radiation of a predetermined wave length or frequency consequently variations of thickness of the film or layer produced by the heat image can be interrogated by a beam of the predetermined radiation. The variation in the absorption of the electromagnetic radiation by the varying thicknesses of the layer or film of water is detected and transformed for visual or electronic observation.

A complete understanding of the invention may be obtained from the following detailed description of the apparatus forming a specific embodiment, when read in conjunction with the drawings, in which;

FIGURE 3 is a graph plotting percentage of transmission of radiation through a layer of water against wave lengths of the radiation at various constant temperatures.

Figures 1, 2:
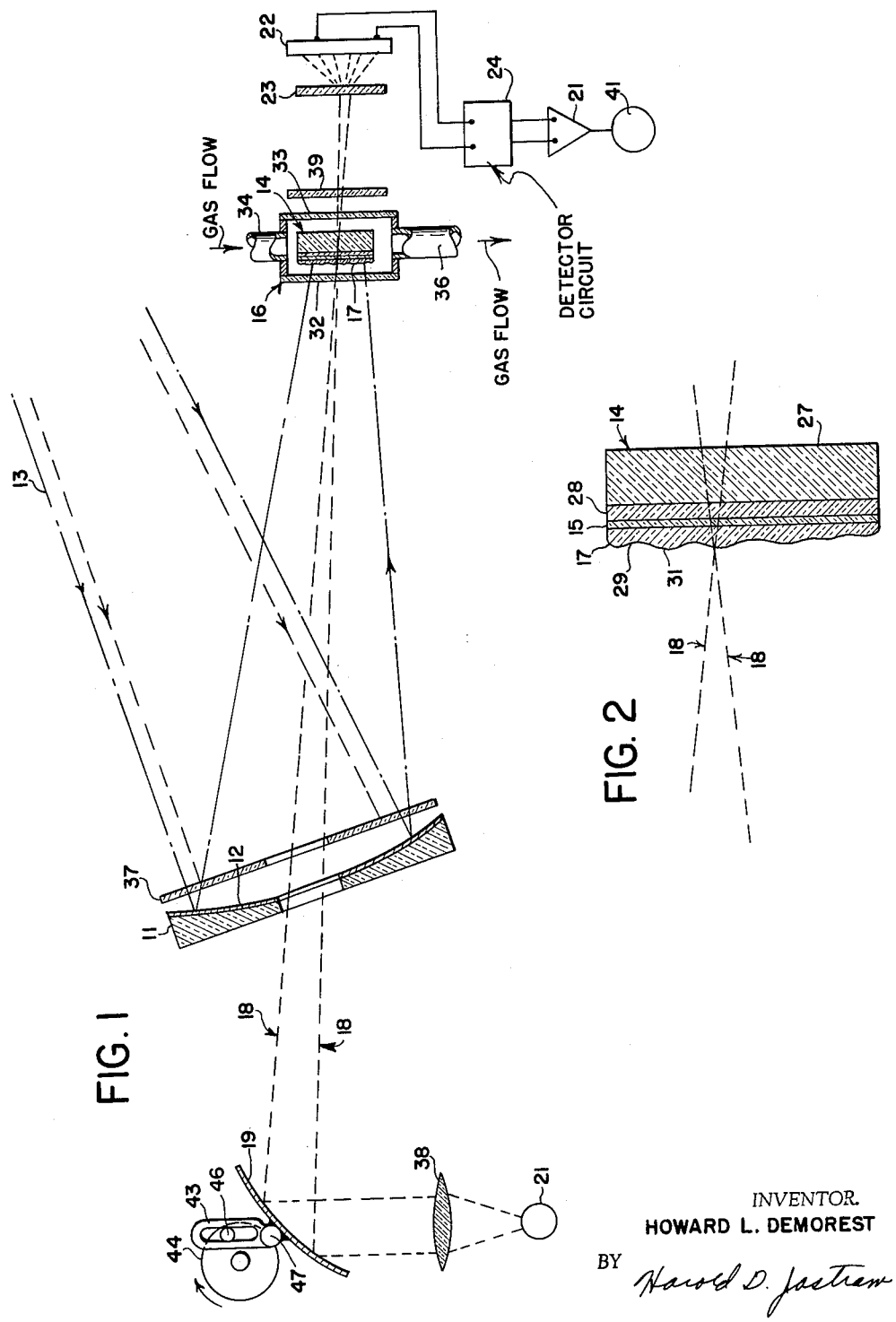
FIGURE 1 is a schematic drawing of a system utilizing the principles of the invention and showing the method of focusing a heat image on a detector cell which is interrogated by a beam of electromagnetic radiation of predetermined frequency.
FIGURE 2 is a cross section of a cell upon which a thin film of material is collected to form a heat image for interrogation.

Refer first to FIGURE 1 of the drawings. A mirror 11 with a reflective surface 12 is utilized to collect and focus radiation such as infrared radiation from a remote source. The infrared radiation designated by a line 13 is reflected from the reflective surface 12 of the mirror 11 and focused on a detector cell 14. The detector cell is composed of several layers of material one of which collects a film of material such as water in a preferred embodiment. The film of water varies in thickness depending upon the variations in intensity of the light or infrared radiation in the preferred embodiment cast upon the film by mirror 11. The cell 14 is placed in a jacket 16 which surrounds the cell 14. A heat image which is formed on layer 17 (see also FIGURE 2), is interrogated by a source of radiation of predetermined frequency and is represented by lines 18 which are focused on the film or layer 17 of water by a mirror 19 and which emanates from a radiation source 21. The electromagnetic radiation from source 21 is attenuated by the layer 17 and passes through cell 14 to a detector 22 through a diffuser 23.

Detector 22 which may be of a usual type such as a photoelectric cell, detects the quantity of radiation which passes through cell 14 and accordingly changes the amount of current which flows in the detector circuit 24. Variations in the attenuation of the beam of electromagnetic radiation represented by line 18, is then detected by the cell 22 and produces variations in the current flow in detector circuit 24 proportional to the attenuation of the radiation. This variation in current flow in the detector circuit is amplified by amplifier 26. The output from amplifier 26 is then used to operate a presentation screen such as an oscilloscope or some similar device so that observation either electronically or visually is accomplished.

Refer now to FIGURE 2 of the drawings for a detailed description of the cell 14 which is utilized to create or produce the heat image for interrogation. Since electromagnetic radiation such as infrared light must pass through the cell 14 in one embodiment of the invention, the base material 27 must be of a type which is transparent to the infrared radiation. Glass is a good example of such a material and can be satisfactorily utilized for the base 27 of cell 14.

Since a layer of material 17 such as water is used for attenuating the beam of interrogating radiation, a layer of substrate material 28 is necessary to collect the water which is to form the layer 17 on cell 14. The interrogating radiation is infrared radiation from about 2.85 to 3.00 microns in wave length but is preferably about 2.93 microns where the layer 12 is water. The material which forms layer 17 may very conveniently be water which is collected from a carrier gas having a relatively constant concentration of water vapor in the carrier gas. If water vapor is to be the collected material to form the layer 17, then the substrate 28 may be formed from a layer of lithium chloride. It is well known that lithium chloride is a suitable substance for collecting a layer of water vapor from a carrier gas such as air and consequently it is the material which has been selected for collecting a layer of water vapor 17 from a carrier gas such as air which is flowing past cell 14. The thickness of substrate 28 and layer 17 are illustrated in the drawing as nearly equal in thickness, however, substrate 28 is normally very thin in comparison to the thickness of layer 17. A relatively thin layer 28 is desirable to eliminate as much as possible, the attenuation of radiation utilized to scan layer 17 and to make the combination of layer 17 and substrate 28 more sensitive to temperature variations produced by variations in the intensity of radiation emanating from a thermal source.

As the carrier gas having a constant predetermined absolute humidity is conducted past the cell 14, a layer of water 17 is collected on the substrate 28 or in other words is sorbed by the substrate 28. The word "sorbed" as noted is being used to include the situation where substrate 28 collects the layer 17 by the process of absorption as well as the collection of the layer by the process of adsorption. When lithium chloride is used, absorption and adsorption is present on the cell. Layer 15 is the area where the water is in solution with the lithium chloride.

A film of water has been selected as the material for forming the heat image forming layer 17, however it is quite possible that a number of suitable materials which are collectible by a properly selected substrate 28 may be used to form the layer 17. In the selection of the material to form layer 17, however, there are several characteristics which must be present in the material. First the material which forms layer 17 must be sensitive to changes in temperature or in the concentration of the electromagnetic radiation which is emanating from the heat source to be detected. In other words if a source of electromagnetic radiation in the infrared wave band is the source which is to be detected, then the material forming layer 17 must be capable of sensing changes in the concentration or quantity of electromagnetic radiation 13 in the infrared wave band. These changes in the concentration or the magnitude of the radiation 13 must be evidenced by a change in thickness of the layer 17 as illustrated in FIGURE 2 of the drawings. Experience has shown that if water is used to form the layer 17 for the heat sensing film 17, the thickness or quantity of the sorbed film is a function of the substrate temperature. The density distribution of the sorbed molecules forming the film or layer 17 corresponds inversely to the temperature distribution of the thermal image. In other words as the temperature of the electromagnetic radiation 13 increases, the thickness of the film of water vapor 17 on the substrate 28 is reduced due to the elevated temperature of the water in the layer as shown by portion 29 of the FIGURE 2. Areas of the thermal source which are transmitting infrared radiation of low intensity correspondingly produce a lower temperature which are sensed by the film of water 17 and result in an increased thickness 31 of the film 17. These variations in the thickness of the film or layer 17 of water are now scanned by a beam of monochromatic radiation which is highly attenuated by a layer of water. This scanning of the layer 17 results in variations in the attenuation of the electromagnetic radiation provided the radiation 18 which is utilized to scan the film 17 is of a frequency which is highly attenuated by the layer of water 17.

One additional criteria is evident from the foregoing description of the material or type of material which is used to form layer 17. Since the device is designed to continuously monitor or detect a source of electromagnetic radiation, the sorption process, that is the collection of a layer of material 17 on substrate 28, is preferably a reversible process. In other words, the variations in temperature which occur due to electromagnetic radiation generated by a thermal source are preferably capable of changing the thickness of the layer 17. Areas of layer 17 which are momentarily reduced in thickness by the heat energy or radiation energy falling upon the area are preferably capable of returning to the original thickness of the layer 17 when no light or energy is falling upon the area. This reversibility of the sorption process enables the cell 14 to form a continuous and continuously changing picture of the variations of the radiation emanating from the thermal source of radiation. Without this reversibility of the process, the original picture or heat image cast upon the layer 17 would remain on cell 14 and the efficiency continuous monitoring or detector of the radiation source would be reduced. Water vapor which is sorbed or collected by lithium chloride is such a combination of substrate 28 and layer which will provide the desirable reversibility of the sorption process so that a continuously changing source of electromagnetic radiation can be detected. The lithium chloride takes up more water from the air when it is cooled and selectively discharges water by evaporation when it is heated.

A source of monochromatic light in the infrared wave band can now be used, provided the thickness layer 17 is composed of water, to interrogate or scan the layer 17 to produce a signal which is utilized to provide a picture of the heat or radiation source. Experiment has disclosed that if a source of infrared radiation having a wave length in the wave band from about 2.85 to 3.00 microns is cast upon a layer of water, the infrared radiation of this particular wave length is highly attenuated. FIGURE 3 discloses a number of curves plotting percentage of transmission of infrared radiation against the wave length of the radiation measured in microns. Water vapor concentration was maintained at 5 gm./m.$^3$. The data for plotting these curves was gathered with the substrate 28 maintained at various temperatures as indicated on the graph. It is apparent from observation of the curves that if infrared radiation of about 2.93 microns wave lengths is utilized, the radiation of this particular wave length is highly attenuated by the layer 17 composed of water. Actually as noted a band width of frequencies having wave lengths from about 2.85 to 3.00 microns is used as the infrared energy for scanning purposes.

Additionally as noted, the thickness of the layer 17 of water varies in accordance with the temperature of the substrate and layer 17. Reference to curves 41 and 42 discloses that a temperature variation of 8° C. results in a change in the attenuation of the radiation of about 7 percent. This temperature change of the layer 17 and substrate 28 brought about by variations in the intensity of radiation from a thermal source, results in variations of thickness of the layer 17 of water and consequently is reflected in variation of attenuation of a beam of infrared radiation used as an interrogating signal. The data for the graph was gathered with a constant concentration of 5 grams of water vapor per cubic meter in the carrier gas which was air. Curve 45 however is for dry air at about 30° C.

If layer 17 is composed of some other material, such as carbon dioxide, then probably a different wave length of infrared radiation will be highly attenuated by the layer of carbon dioxide. A cell 14 which utilizes the layer of carbon dioxide can be altered to include a layer 28 of some material which sorbs carbon dioxide rather than water vapor and the source of scanning radiation 18 which is highly attenuated by a layer or film of carbon dioxide sorbed on substrate 28, may be selected as the scanning frequency which will produce the proper variations of attenuation of the scanning frequency so that the variation can be detected by a suitable detector such as a photocell. As noted, however, the layer 17 is preferably a layer or film of water collected by lithium chloride. For this particular arrangement, it has been found that infrared radiation as disclosed by FIGURE 13 preferably having wave lengths in the band from 2.85 to 3.00 microns is the best range of frequencies for interrogating or scanning the layer 17 of water.

Experimentation with a cell 14 utilizing lithium chloride as a substrate 28 and a collected layer or film 17 of water indicated that if the substrate 28 and layer 17 are heated to a temperature of 5° C. by infrared radiation 13 which is cast upon the layer 28 and 17, that only about 8 percent of the radiation 18 of a wave length of about 2.93 microns is passed through the layer 17. Thus, when the substrate 28 and film 17 are heated to a temperature of 5° C., 92 percent of the interrogating radiation 18 is attenuated by the layer 17 of water vapor. When, however, the temperature of the substrate 28 and layer 17 is changed to 10° C. as illustrated by portion 29 of FIGURE 2, 13 percent of the interrogating frequency or radiation 18 was permitted to pass through the layer 17 to the opposite side of cell 14. Thus a change of 5° C. in the temperature distribution of the radiation source 13 resulted in a great change in the amount of energy which was passed through the film of water vapor 17. This means that a detector which is monitoring the attenuation of the scanning frequency 18 would produce a signal which would increase in proportion to the change in energized attenuation for a change in temperature of only 5° C. This variation of attenuation of the scanning radiation 18 is then transformed to an electrical signal which can be utilized to form a visual picture of the heat source. The percent transmission of course will be dependent on the constant concentration of water vapor in the air or absolute humidity since a higher absolute humidity will result in a greater average thickness for water layer 17.

In operation the detector cell 14 may be utilized in the following manner. The cell 14 having the substrate 28 on one surface thereof is placed in a jacket 16 which has a pair of transparent windows 32 and 33 for permitting infrared radiation 13 and scanning radiation 18 to pass into the jacket 16 to strike cell 14. Window 32 permits the scanning radiation 18 to exit from the jacket 16 to be monitored by the detector 22.

After cell 14 is placed in jacket 16 and prior to formation of a heat image on the cell 14, a flow of gas containing water vapor is conducted into inlet 34 of the jacket 16 and is conducted past the cell and out outlet 36 of the jacket 16. The carrier gas which may be air is held at a constant temperature so that temperature variations of the carrier gas do not produce an erroneous reading of the image cast upon layer 28. The absolute humidity of the carrier gas is also maintained constant in order that the thickness of layer 17 may be maintained constant at an equilibrium thickness which is as noted is also dependent upon the temperature of the carrier gas, the temperature of the cell, and the absolute humidity of the carrier gas. After an equilibrium thickness of water vapor has been collected by the lithium chloride substrate 28, a thermal image of a remote source of radiation is collected by mirror 11 and focused upon the layer 17 of water. Variations in the intensity of the radiation 13 produces variation in temperature along the surface of the substrate 28 and the layer 17 thus producing variations in the thickness of the layer of water 17 as the water evaporates from the various areas of the surface of substrate 28.

A filter 37 is placed in front of the mirror 11 in order to filter out electromagnetic radiation having a wave length of the preferred wave band between about 2.85 to 3.00 microns. If radiation from the thermal source having the same wavelength as the beam of radiation used for scanning purposes is permitted to strike the layer 17, it acts as noise and interferes with the beam of scanning or interrogating radiation from source 21. Exclusion of this particular frequency of radiation from the total radiation arriving at mirror 11 from the thermal source does not introduce an intolerable error in the thermal picture or image which is formed since the frequency constitutes a very select frequency in the infrared wave band.

After the thermal or heat image is formed in layer 17, a beam of radiation having a wave length of about 2.85 to 3.00 microns from source 21 is cast upon a focusing lens 38 which transmits the radiation to a mirror 19. Mirror 19 in turn focuses the beam of scanning radiation upon the cell 14. Some type of mechanical oscillating mechanism such as cam arm 43 and wheel 44 may be utilized in connection with mirror 19 in order to rotate mirror 19 through a small arc so that the focused beam radiation is continuously cast across the surface of the layer 17 in the same manner that a beam of electrons is continuously moved across the face of a television screen in order that variations in the thickness of the film or layer 17 may attenuate the beam of scanning radiation 18. Cam arm 43 is connected to mirror 19 so that as rotating wheel 44 moves cam 46 in a circular path, the cam 46 engages cam arm 43 and oscillates the arm 43 about pivot shaft 47. The oscillations of the arm 43 result in oscillatory movement of mirror 19 which thus periodically moves beam 18 of radiation across the surface of cell 14.

Mirror 19 may be used as a device to focus a spot of light which is continuously moved across and as well as up and down across cell 14 or a slotted plate may be inserted between mirror 19 and mirror 11 to produce a rod or band of light for sweeping across cell 14. Preferably a spot of light might be used and a number of well known mechanisms may be utilized to produce the proper scanning movement.

As the beam of radiation 18 scans the layer 17, variations in attenuation as previously noted occur so that the intensity of the scanning radiation which emerges through the transparent cell 14 and transparent window 33 varies in intensity. The scanning beam of radiation next passes through a filter 39 which passes only infrared radiation having a wave length within the preferred wave band. This filter 39 is necessary so that none of the radiation 13 from the radiation source passes through the cell 14 to strike detector 22 thus producing an error in the detection of the scanning frequency 18. The attenuated signal 18 then falls upon a diffuser 23 which diffuses the beam of scanning radiation before it is cast upon detector 22. Diffuser 23 is not absolutely essential but is illustrated as a possible element which may be used in connection with the detector 22. The diffuser merely distributes the radiation over the surface of detector 22 to insure accurate detection of the radiation.

The detector 22 preferably is a detector which is responsive only to a frequency of electromagnetic radiation of about 2.95 microns wave length. This selective response of detector 22 additionally eliminates any error signal which may escape the various filters in the system. The detector 22, which as noted, could be a photoelectric cell detects the variations in the attenuation of the scanning beam 18 and accordingly changes the current flow in the detector circuit 24. Detector circuit 24 may be the usual Wheatstone Bridge device for detecting changes in current or changes in voltage or the detector circuit 24 may be any one of several other well known electronic detector circuits capable of distinguishing variations in electrical current or voltage. These changes in current or voltage are then amplified by an amplifier 26. The amplified electrical signal is then fed to a presentation screen 41 which, for purposes of illustration, may be an oscilloscope where the variations of current which are indicative of the attenuation of the radiation beam 18 are presented on a screen. Thus it can be seen that the variations in the intensity of radiation emanating from a particular thermal source are detected and transformed to a usable electrical signal which may be visually observed or electronically observed by proper equipment.

There are a number of variations of the present system which may be utilized depending upon the environment into which the detector cell 14 must be placed or depending upon a particular wave length of the radiation which is to be detected. For instance, cell 14 may be constructed so that it reflects the radiation both from the source and the scanning beam 18. Additionally, the layer 17 may be composed of some other type of material other than water vapor which of course would require a change in the substrate 28 necessary to collect a suitable layer of the particular material utilized.

A change of the material composing layer 17, however would also require a change in the wave length of the beam of scanning radiation 18 depending upon, of course, the wave length which is most highly attenuated by the particular material used in the layer 17.

It is to be understood that the above described arrangements are simply illustrative of the application of the principles of the invention. Numerous other arrangements may be readily devised by those skilled in the art which will embody the principles of the invention and fall within the spirit and scope thereof.

Now therefore I claim:

1. A radiation detection device which comprises means for collecting a layer of material which attenuates a predetermined wave length of electromagnetic radiation and which layer varies in thickness in accordance with the intensity of electromagnetic radiation falling on said layer, means for casting a beam of said predetermined wave length of radiation upon said layer, and means for detecting the variations in attenuation of said predetermined wave length of radiation.

2. A radiation detection device which comprises means for collecting a layer of liquid material which attenuates a predetermined wave length of radiation from a stream of carrier gas, said layer varies in thickness in accordance with the intensity of electromagnetic radiation falling on said layer, means for directing a flow of carrier gas and material past said means for collecting, means for casting a beam of said predetermined wave length of radiation upon said layer, and means for detecting variations in attenuation of said predetermined wave length of radiation.

3. A radiation detection device which comprises means for collecting a liquid layer of material from a carrier gas which layer varies in thickness in accordance with the intensity of electromagnetic radiation from a thermal source falling on said layer, said material when collected as a liquid layer highly attenuates a predetermined wave length of infrared radiation, means for directing a constant flow of carrier gas with a predetermined concentration of said material past said means for collecting, means for casting a beam of infrared radiation of said predetermined wave length upon said layer, and a radiation detector for sensing variations in the attenuation of said beam of radiation.

4. A device in accordance with claim 3 which further includes means for focusing said electromagnetic radiation on said layer to form a thermal picture in said layer which varies the thickness of said layer according to the intensity variations of said radiation.

5. A device in accordance with claim 3 in which said detector includes an electrical system for generating an electrical signal indicative of the variation in the attenuation of said predetermined beam of radiation.

6. A devce in accordance with claim 3 in which said layer is water, said material is water vapor, said carrier gas is air and said means for collecting includes a cell having a layer of LiCl for collecting a layer of water from said water vapor in said air.

7. A device in accordance with claim 3 in which said layer is water and in which said beam of infrared radiation has a wave length of from 2.85 to 3.00 microns.

8. A thermal image detector which comprises means for collecting a liquid layer of material from a stream of carrier gas, which material highly attenuates a predetermined wave length of radiation, said layer varies in thickness in accordance with the intensity of electromagnetic radiation cast on said layer, means for directing a constant flow of said carrier gas having a constant concentration of said material past said means for collecting, a reflector for casting radiation from a thermal source on said layer to vary the thickness of said layer in accordance with the variations in intensity of said radiation, means for generating said predetermined wave length of radiation, means for casting a beam of said predetermined wave length of radiation on said layer and for periodically moving said beam across said layer, and a radiation detector for sensing variations in the attenuation of said radiation of predetermined wave length.

9. A thermal image detector which comprises a cell having a base transparent to infrared radiation and having a substrate of LiCl for collecting a layer of water vapor from a stream of carrier gas which layer varies in thickness in accordance with the intensity of radiation falling on said layer, means for directing a constant flow of said air with a constant absolute humidity past said cell, means for directing radiation on said layer from a thermal source to form a thermal image in said layer, means for casting a beam of infrared radiation having a wave length of from 2.85 to 3.00 microns on said layer and for periodically moving said beam across said layer, and means for detecting variation in attenuation of said beam of infrared radiation which passes through said cell.

References Cited in the file of this patent

UNITED STATES PATENTS

| | | |
|---|---|---|
| 2,981,913 | Barns et al. | Apr. 25, 1961 |
| 3,005,914 | Feldman et al. | Oct. 24, 1961 |
| 3,057,999 | Newman et al. | Oct. 9, 1962 |